(12) United States Patent
Yang et al.

(10) Patent No.: US 11,615,011 B2
(45) Date of Patent: Mar. 28, 2023

(54) APPARATUS AND METHOD FOR OPTIMIZING RELIABILITY OF SATELLITE SYSTEM CONSIDERING BOTH HARD ERROR STABILITY AND SOFT ERROR STABILITY

(71) Applicant: AJOU UNIVERSITY INDUSTRY-ACADEMIC COOPERATION FOUNDATION, Suwon-si (KR)

(72) Inventors: Hoeseok Yang, Suwon-si (KR); Beomsik Kim, Cheonan-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/576,159

(22) Filed: Jan. 14, 2022

(65) Prior Publication Data

US 2022/0261305 A1 Aug. 18, 2022

(30) Foreign Application Priority Data

Feb. 18, 2021 (KR) .................. 10-2021-0021651

(51) Int. Cl.
*G06F 11/00* (2006.01)
*G06F 11/34* (2006.01)
(Continued)

(52) U.S. Cl.
CPC ........ *G06F 11/3409* (2013.01); *G06F 9/4893* (2013.01); *G06F 11/076* (2013.01);
(Continued)

(58) Field of Classification Search
CPC ............. G06F 11/0703; G06F 11/0736; G06F 11/0739; G06F 11/0751; G06F 11/076;
(Continued)

(56) References Cited

U.S. PATENT DOCUMENTS 8,478,567 B2 * 7/2013 Salsbery ............... H04W 24/08
702/182
2012/0311592 A1 * 12/2012 Kim ..................... G06F 9/4893
718/102
(Continued)

FOREIGN PATENT DOCUMENTS

KR 10-2012-0133844 A 12/2012
KR 10-2017-0108636 A 9/2017
(Continued)

OTHER PUBLICATIONS

Y. Ma, J. Zhou, T. Chantem, R. P. Dick, S. Wang and X. S. Hu, "Online Resource Management for Improving Reliability of Real-Time Systems on "Big-Little" Type MPSoCs," in IEEE Transactions on Computer-Aided Design of Integrated Circuits and Systems, vol. 39, No. 1, pp. 88-100, Jan. 2020 (Year: 2020).*
(Continued)

*Primary Examiner* — Anthony J Amoroso
(74) *Attorney, Agent, or Firm* — Sughrue Mion, PLLC

(57) ABSTRACT

An apparatus and a method for optimizing a satellite system considering a hard error stability and a soft error stability are disclosed. The satellite system optimizing method which considers a hard error stability and a soft error stability according to an exemplary embodiment of the present disclosure includes acquiring hardware information of a processor which is loaded in the satellite system; acquiring workload information including a task which is performed by the processor; establishing a scheduling policy for the task based on the hardware information and the workload (Continued)

information; and quantifying a soft error stability and a hard error stability in accordance with the scheduling policy.

13 Claims, 8 Drawing Sheets

(51) Int. Cl.
  *G06F 11/07* (2006.01)
  *G06F 11/30* (2006.01)
  *G06F 9/48* (2006.01)
(52) U.S. Cl.
  CPC ...... *G06F 11/0772* (2013.01); *G06F 11/3013* (2013.01); *G06F 11/3058* (2013.01)
(58) Field of Classification Search
  CPC ............ G06F 11/0772; G06F 11/0796; G06F 11/3013; G06F 11/302; G06F 11/3065; G06F 11/3058; G06F 11/3409; G06F 11/3452; G06F 9/4881; G06F 9/4893; G06F 9/5044; G06F 9/5055
  See application file for complete search history.

(56) References Cited

U.S. PATENT DOCUMENTS

| 2014/0223237 | A1* | 8/2014 | Portolan | G06F 11/263 |
|---|---|---|---|---|
| | | | | 714/33 |
| 2017/0344422 | A1* | 11/2017 | Kwon | G11C 29/52 |
| 2019/0108066 | A1* | 4/2019 | Kim | G06F 9/38 |
| 2021/0232201 | A1* | 7/2021 | Chen | G06F 9/547 |

FOREIGN PATENT DOCUMENTS

| KR | 10-2017-0133545 A | 12/2017 | | |
|---|---|---|---|---|
| WO | WO-2020078135 A1 * | 4/2020 | ............ | G06F 1/206 |

OTHER PUBLICATIONS

R. Tabish, R. Mancuso, S. Wasly, S. S. Phatak, R. Pellizzoni and M. Caccamo, "A Reliable and Predictable Scratchpad-centric OS for Multi-core Embedded Systems," 2017 IEEE Real-Time and Embedded Technology and Applications Symposium (RTAS), 2017, pp. 377-388 (Year: 2017).*

J. Zhou, X. S. Hu, Y. Ma, J. Sun, T. Wei and S. Hu, "Improving Availability of Multicore Real-Time Systems Suffering Both Permanent and Transient Faults," in IEEE Transactions on Computers, vol. 68, No. 12, pp. 1785-1801, Dec. 1, 2019 (Year: 2019).*

X. Zhu, J. Wang, X. Qin, J. Wang, Z. Liu and E. Demeulemeester, "Fault-Tolerant Scheduling for Real-Time Tasks on Multiple Earth-Observation Satellites," in IEEE Transactions on Parallel and Distributed Systems, vol. 26, No. 11, pp. 3012-3026, Nov. 1, 2015 (Year: 2015).*

O. Gonzalez, H. Shrikumar, J. A. Stankovic and K. Ramamritham, "Adaptive fault tolerance and graceful degradation under dynamic hard real-time scheduling," Proceedings Real-Time Systems Symposium, 1997, pp. 79-89 (Year: 1997).*

G. von der Brüggen, K. H. Chen, W. H. Huang and J. J. Chen, "Systems with Dynamic Real-Time Guarantees in Uncertain and Faulty Execution Environments," 2016 IEEE Real-Time Systems Symposium (RTSS), 2016, pp. 303-314 (Year: 2016).*

H. Aysan, R. Dobrin, S. Punnekkat and R. Johansson, "Probabilistic Schedulability Guarantees for Dependable Real-Time Systems under Error Bursts," 2011IEEE 10th International Conference on Trust, Security and Privacy in Computing and Communications, 2011 (Year: 2011).*

J. Zhou, X. S. Hu, Y. Ma and T. Wei, "Balancing lifetime and soft-error reliability to improve system availability," 2016 21st Asia and South Pacific Design Automation Conference (ASP-DAC), 2016, pp. 685-690 (Year: 2016).*

Y. Xiang and S. Pasricha, "Soft and Hard Reliability-Aware Scheduling for Multicore Embedded Systems with Energy Harvesting," in IEEE Transactions on Multi-Scale Computing Systems, vol. 1, No. 4, pp. 220-235, Oct. 1-Dec. 2015 (Year: 2015).*

Kim, Beomsik, and Hoeseok Yang. "Temperature sensor assisted lifetime enhancement of satellite embedded systems via multi-core task mapping and DVFS." Sensors 19, No. 22 (2019): 4902. (Year: 2019).*

Y. Gao, S. K. Gupta, Y. Wang and M. Pedram, "An energy-aware fault tolerant scheduling framework for soft error resilient cloud computing systems," 2014 Design, Automation & Test in Europe Conference & Exhibition (Date), 2014, pp. 1-6 (Year: 2014).*

Chebiyyam Sivaram Murthy; Govindarasu Manimaran, "Fault-Tolerant Task Scheduling in Multiprocessor Real-Time Systems," in Resource Management in Real-Time Systems and Networks, MIT Press, 2001, pp. 97-131. (Year: 2001).*

\* cited by examiner

[FIG. 1]
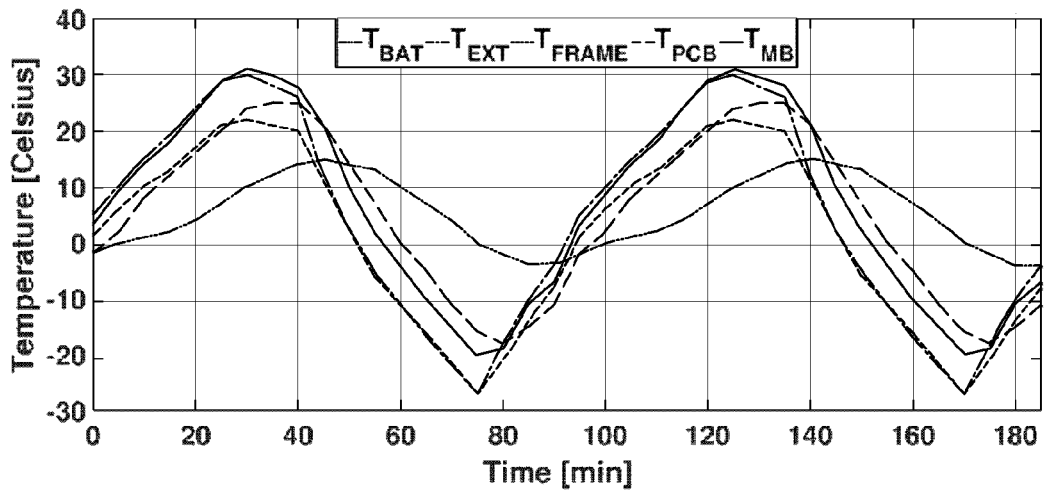
[FIG. 2]
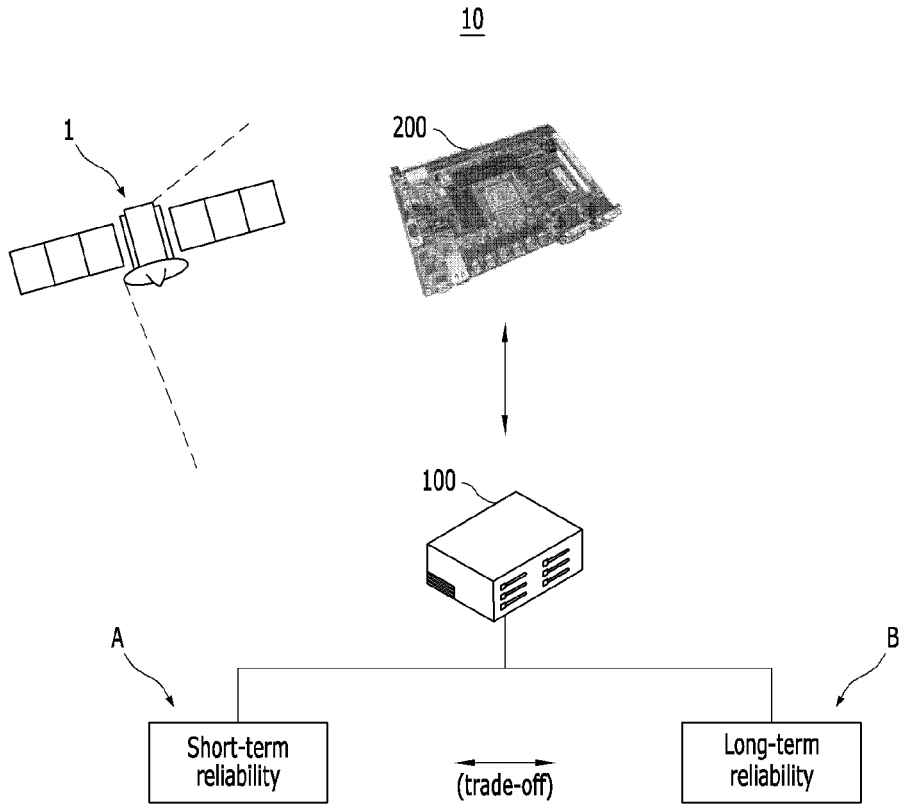

[FIG. 3]
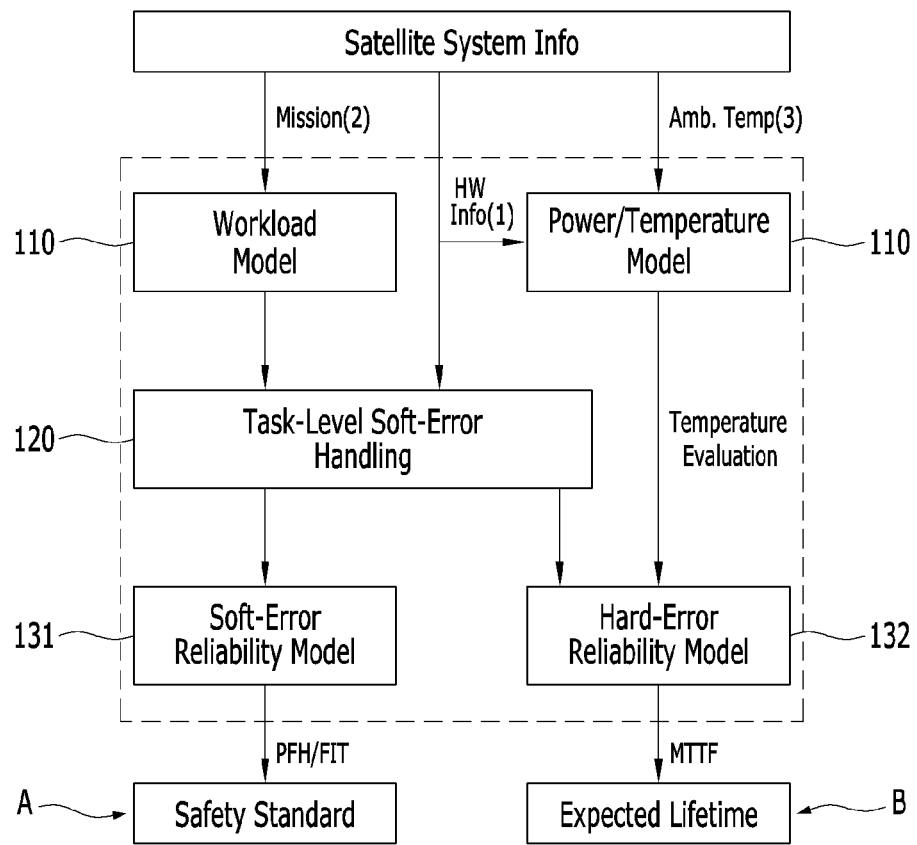

[FIG. 4]
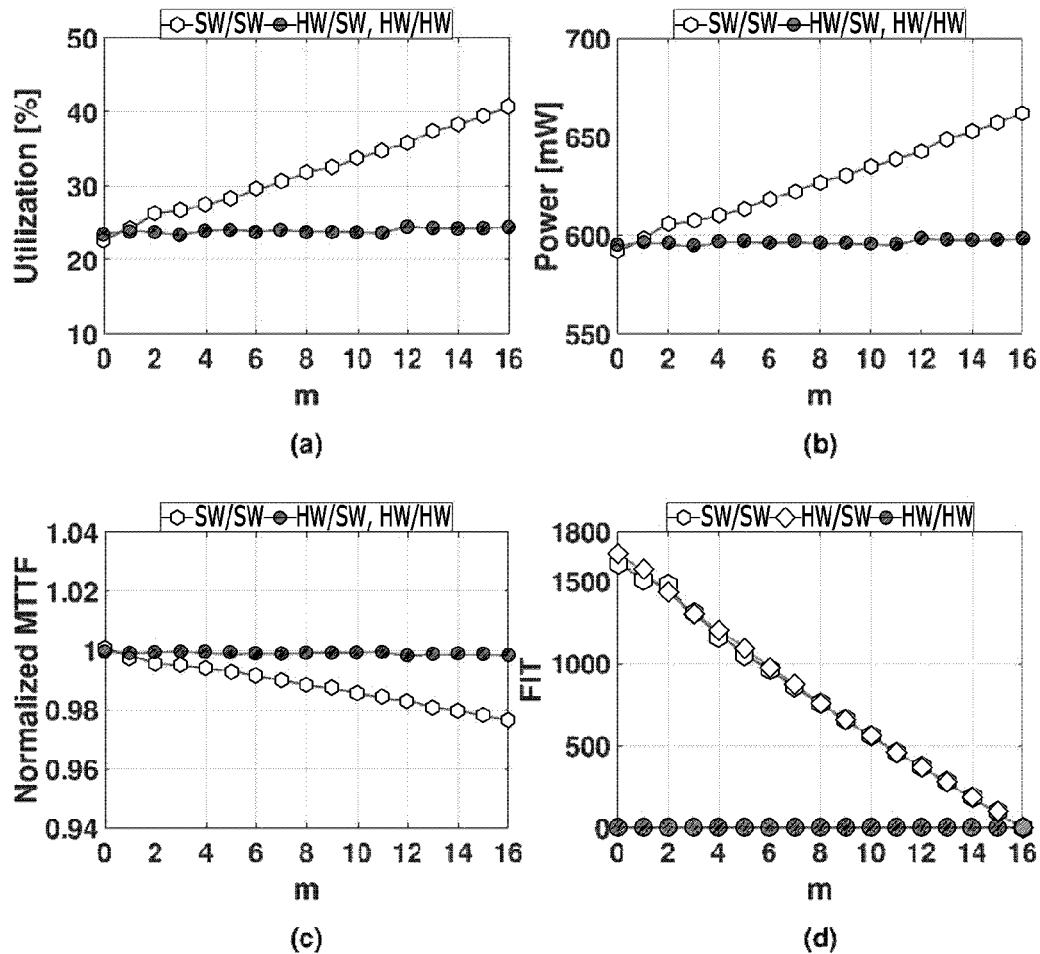
[FIG. 5]
| DO-178B | IEC-61508 | ISO-26262 | PFH | FIT |
|---|---|---|---|---|
| A | SIL 4 | ASIL D | $< 10^{-9}$ | 1 |
| B | | | $< 10^{-8}$ | 10 |
| | SIL 3 | ASIL C, B | $< 10^{-7}$ | 100 |
| C | SIL 2 | - | $< 10^{-6}$ | 1000 |
| | SIL 1 | - | $< 10^{-5}$ | 10000 |
| D | - | - | $\geq 10^{-5}$ | 10000 |
| E | - | - | - | - |

[FIG. 6]
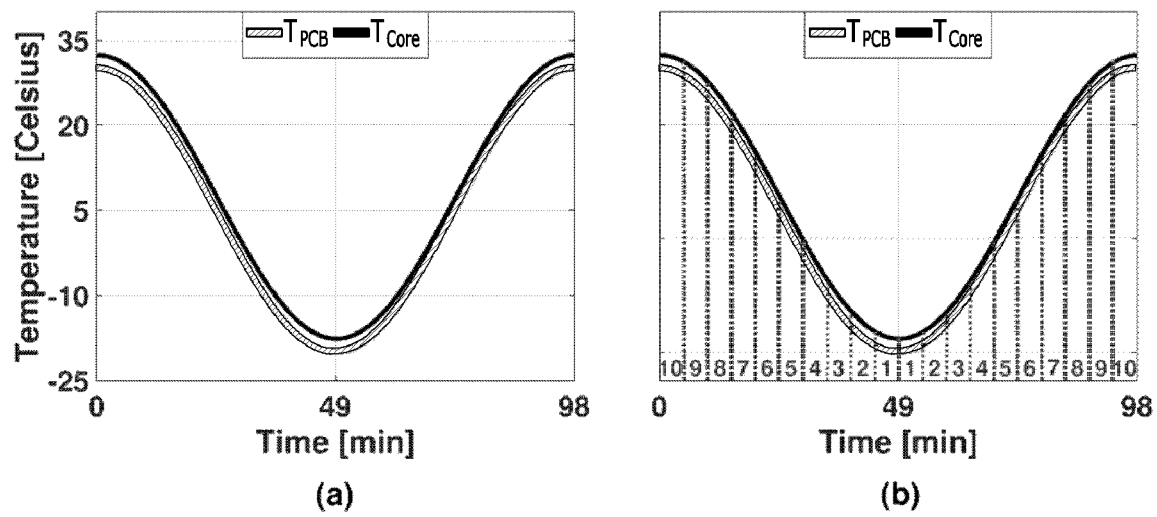

[FIG. 7A]
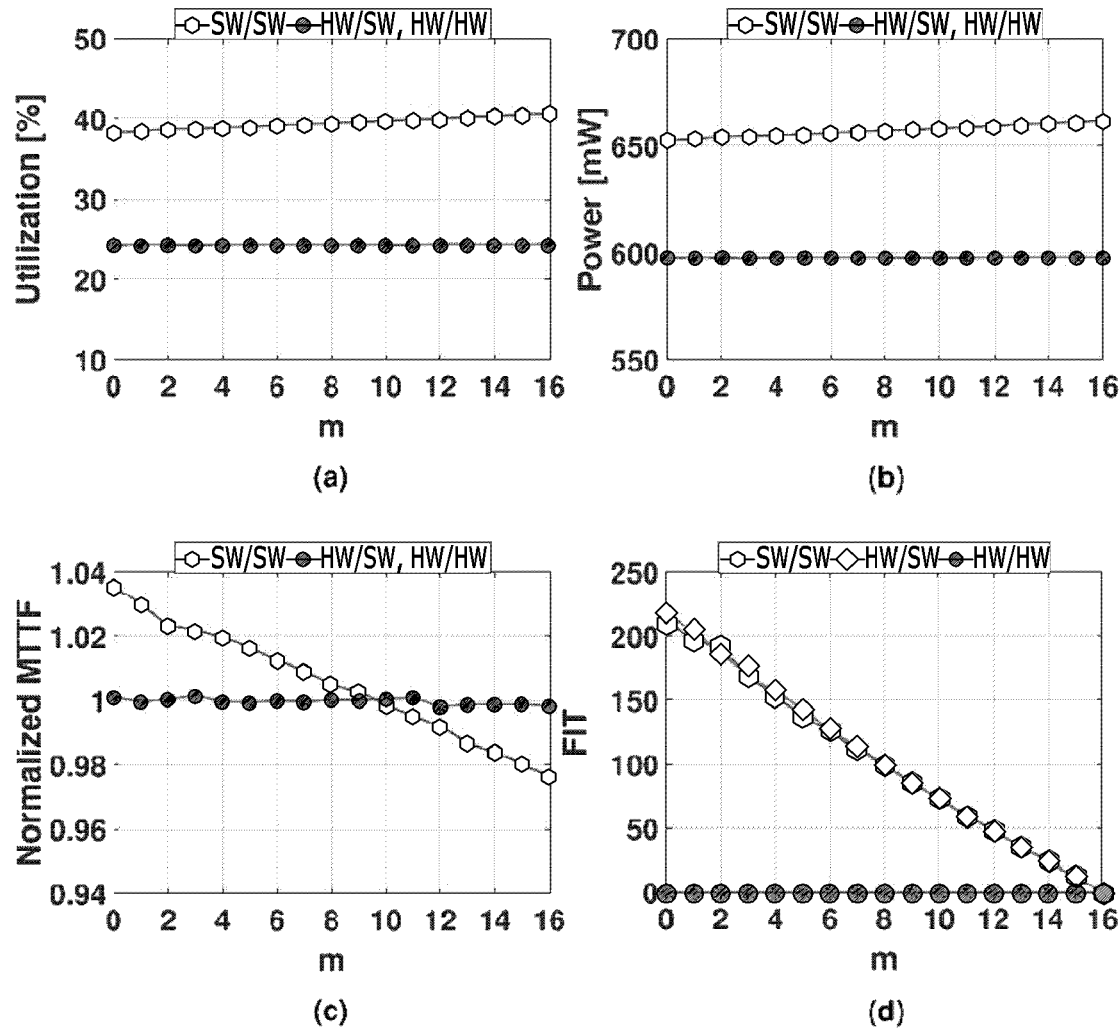

[FIG. 7B]
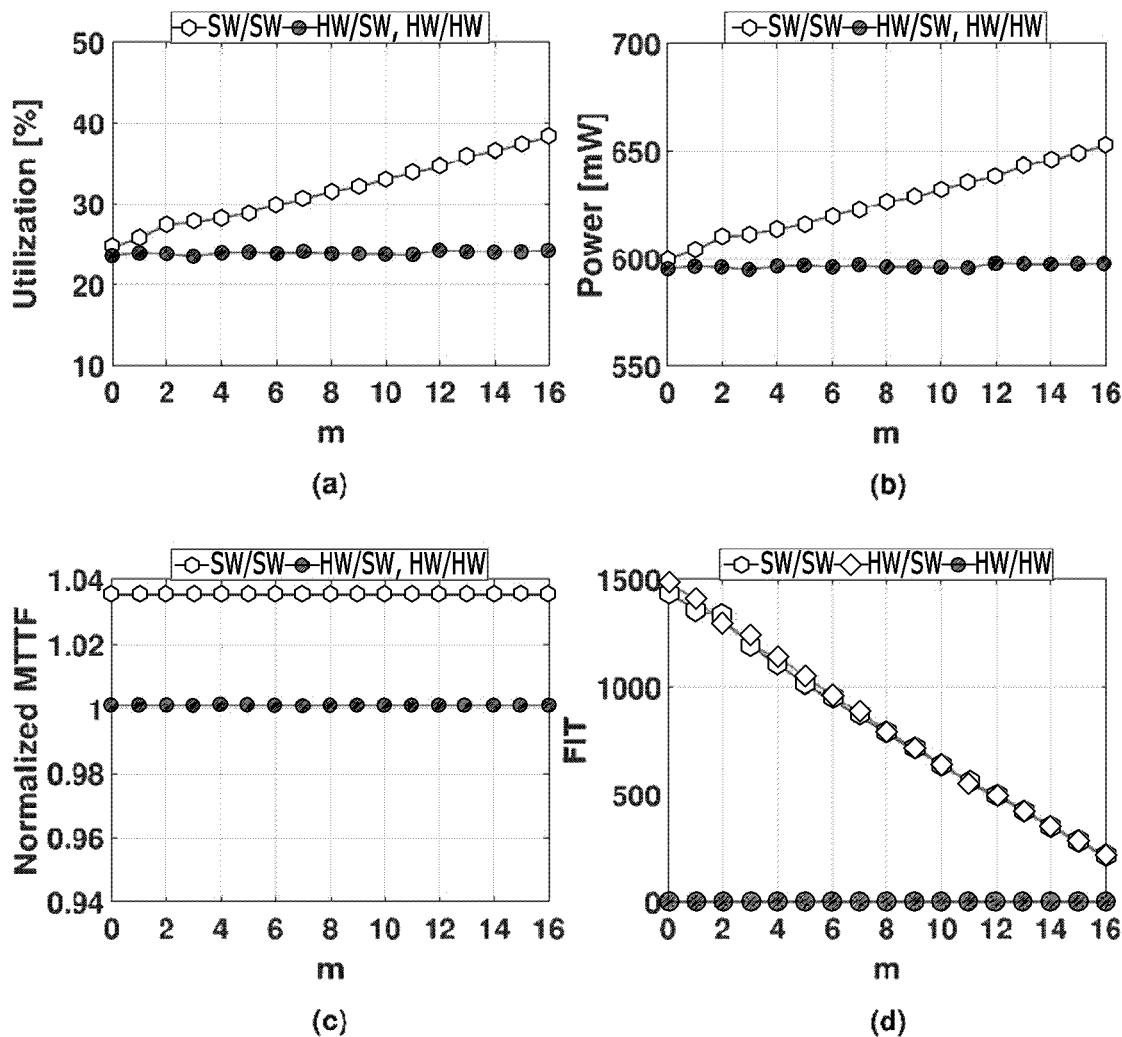

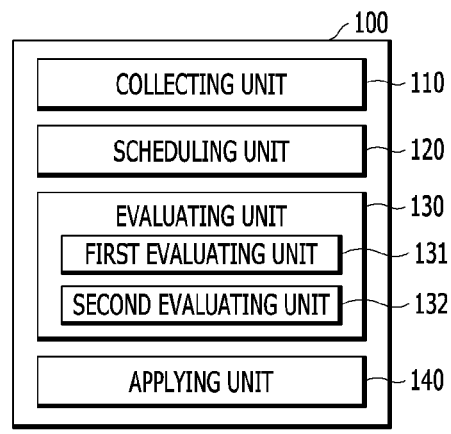
[FIG. 8]

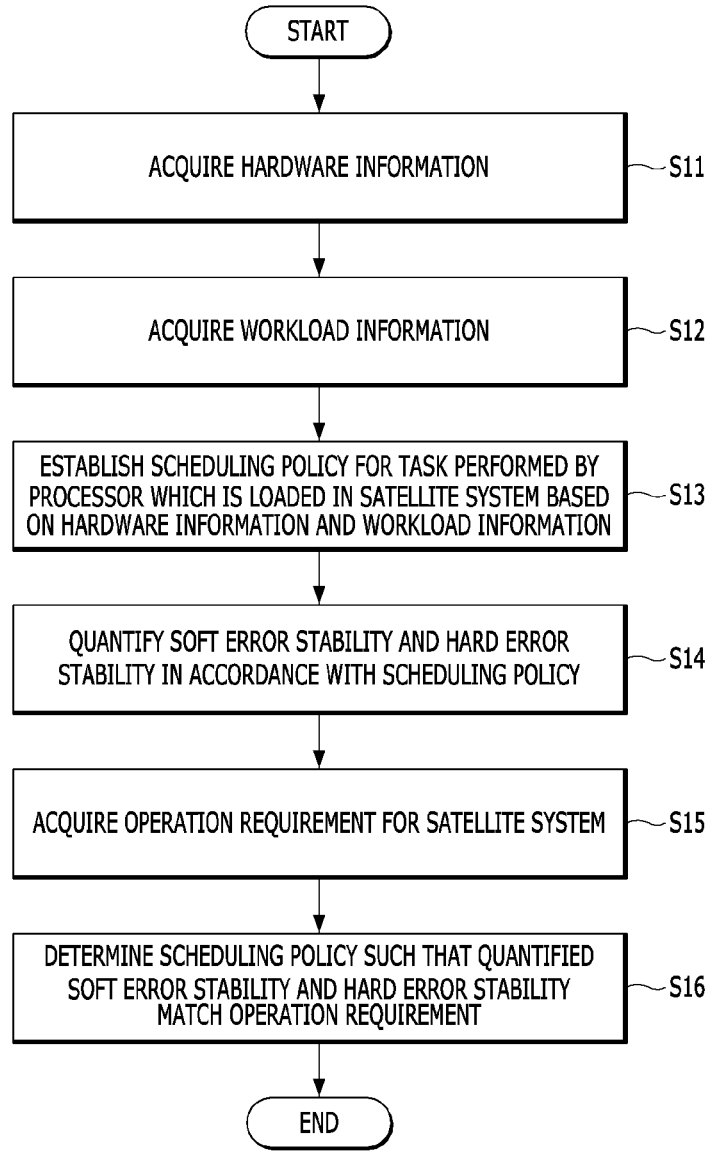
[FIG. 9]

APPARATUS AND METHOD FOR OPTIMIZING RELIABILITY OF SATELLITE SYSTEM CONSIDERING BOTH HARD ERROR STABILITY AND SOFT ERROR STABILITY

CROSS-REFERENCE TO RELATED APPLICATIONS

This application claims the priority of Korean Patent Application No. 10-2021-0021651 filed on Feb. 18, 2021, in the Korean Intellectual Property Office, the disclosure of which is incorporated herein by reference.

BACKGROUND

Field

The present disclosure relates to an apparatus and a method for optimizing a satellite system considering a hard error stability and a soft error stability, and more particularly, to a technique for collectively analyzing and optimizing a soft error stability and a hard error stability of a processor which operates in a severe environment in which a temperature significantly changes or exposure to radiation exists, such as a satellite.

Description of the Related Art

A stability (reliability) requirement becomes important more and more in a real-time embedded system, and various functional safety standards which reflect the stability (reliability) requirement of the system, such as IEC-61508, DO-178B, or ISO-26262, are defined. Specifically, the stability (reliability) which is considered in the embedded system is divided into a soft error stability and a hard error stability.

First, the soft error stability is mainly affected by a single-event upset (SEU) and the single-event upset refers to a phenomenon that a stored bit value is temporally changed from 0 to 1 or 1 to 0 without causing a permanent damage to a semiconductor. It is known that the single-event upset is mainly caused by cosmic rays which are neutrons or alpha particles and the vulnerability to the soft error is increasing as the semiconductor process unit becomes very small and an operating voltage is lowered. Specifically, in systems such as flights, satellites, automobiles, medical devices which require a high reliability, a failure to tolerate the soft error may lead to serious consequences such as losses of property or life due to an erroneous operation. With regard to this, as various protection and reinforcement techniques using hardware and software to detect and tolerate the soft error, protection techniques, such as dual modular redundancy or triple modular redundancy of the hardware, a watchdog timer, a software redundant operation, an error correction code (ECC), control flow checking, or memory scrubbing, are applied. However, there is a limitation that such protection techniques are accompanied by additional hardware or computational overhead.

Further, the hard error stability is affected by a permanent damage of the hardware and a major factor which affects the hard error reliability in CMOS integrated circuits (ICs) is a temperature. Specifically, a failure mechanism includes electromigration (EM), time-dependent dielectric breakdown (TDDB), stress migration (SM), thermal cycling (TC) and the like. The damage by this mechanism is highly dependent on the maximum temperature of the semiconductor and the higher the temperature, the more the adverse effect on the lifetime. Among them, the thermal cycling (TC) mechanism is affected not only by the maximum temperature of the system, but also by an amplitude and a period of the thermal cycling.

With regard to this, most of the techniques of the related art which improve the hard error stability (reliability) mainly focus on reducing (lowering) the operation temperature of the processor.

In the meantime, a space environment in which the satellite operates is a severe environment in which the temperature greatly changes and cosmic rays exist. Therefore, it is very important to design a system to have a high stability (reliability) to guarantee a long operation time without causing the failure of the satellite in such an extreme environment.

With regard to this, FIG. 1 is a view illustrating a periodic change in an ambient temperature of a low earth orbit (LEO) satellite. Referring to FIG. 1, an ambient temperature of a low earth orbit (LEO) satellite such as SwissCUbe has a characteristic that a temperature very widely changes in accordance with the passage of time and has a constant period.

In the environment in which the satellite system operates which will be understood with reference to FIG. 1, the hard error stability of the processor is expected to be deteriorated due to the large temperature change therearound and the soft error stability is also considered to be important due to the cosmic rays.

In the meantime, when the protection technique using software is aggressively applied to improve the soft error stability by the cosmic rays in the satellite environment, the power consumption of the processor is increased due to the increased computational overhead thereby so that a heat generation amount is increased, which results in deterioration of the hard error stability. In contrast, when only the heat generation amount of the processor is adjusted based on the ambient temperature of the satellite by considering only the hard error stability, the computation for improving the soft error stability is not sufficiently performed, which deteriorates the soft error stability.

That is, it is requested to develop a technique for optimizing a satellite system to satisfy functional safety-related requirements by considering both the soft error stability and the hard error stability of the processor in the satellite environment.

A background art of the present disclosure is disclosed in Korean Unexamined Patent Application Publication No. 10-2017-0133545.

SUMMARY

The present disclosure is provided to solve the above-described problems of the related art and an object of the present disclosure is to provide an apparatus and a method for optimizing a satellite system by considering a hard error stability and a soft error stability which analyze the soft error stability and the hard error stability by adjusting a task scheduling of a processor in a system which cannot be consistently maintained or corrected, but needs to operate for a long time without having errors, such as a satellite, to optimize the system.

However, objects to be achieved by various embodiments of the present disclosure are not limited to the technical objects as described above and other technical objects may be present.

As a technical means to achieve the above-described technical object, according to an aspect of the present disclosure, a satellite system optimizing method which considers a hard error stability and a soft error stability may include acquiring hardware information of a processor which is loaded in the satellite system; acquiring workload information including a task which is performed by the processor; establishing a scheduling policy for the task based on the hardware information and the workload information; and quantifying a soft error stability and a hard error stability in accordance with the scheduling policy.

Further, the quantifying may include calculating an error occurrence probability associated with the soft error stability by considering the scheduling policy; and calculating a system lifetime associated with the hard error stability based on the hardware information, the scheduling policy, and ambient temperature information of the satellite system.

Further, in the establishing of a scheduling policy, an iterative performance level for each task to perform at least one of a detecting operation and a correcting operation of a possible error during the task may be determined.

Further, the hardware information may include information about a heat generation pattern and a power consumption pattern of the processor in accordance with the performance of the task.

Further, in the calculating of a system lifetime, the system lifetime may be calculated by reflecting the heat generation pattern and the power consumption pattern which change based on the iterative performance level.

Further, the iterative performance level for a predetermined task may vary as the frequency of the detecting operation or the correcting operation changes.

Further, a variation width of the iterative performance level in accordance with the change of the frequency of the correcting operation may be larger than a variation width in accordance with the change of the frequency of the detecting operation.

Further, the satellite system optimizing method which considers a hard error stability and a soft error stability according to the exemplary embodiment of the present disclosure further may include acquiring an operation requirement for the satellite system; and updating the scheduling policy such that the quantified soft error stability and hard error stability match the operation requirement.

Further, in the updating of the scheduling policy, the iterative performance level may be determined in accordance with an interval of an operation period of the satellite system which is divided into a plurality of intervals based on the ambient temperature information.

In the meantime, according to another aspect of the present disclosure, a satellite system optimizing apparatus which considers a hard error stability and a soft error stability may include a collecting unit which acquires hardware information of a processor which is loaded in the satellite system and workload information including a task which is performed by the processor; a scheduling unit which establishes a scheduling policy for the task based on the hardware information and the workload information; and an evaluating unit which quantifies a soft error stability and a hard error stability in accordance with the scheduling policy.

Further, the evaluating unit may include a first evaluating unit which calculates an error occurrence probability associated with the soft error stability by considering the scheduling policy; and a second evaluating unit which calculates a system lifetime associated with the hard error stability based on the hardware information, the scheduling policy, and ambient temperature information of the satellite system.

Further, the scheduling unit may determine an iterative performance level for each task to perform at least one of a detecting operation and a correcting operation of a possible error during the task.

Further, the second evaluating unit may calculate the system lifetime by reflecting the heat generation pattern and the power consumption pattern which change based on the iterative performance level.

Further, the second evaluating unit may calculate the system lifetime by considering at least one failure mechanism among electromigration (EM), time-dependent dielectric breakdown (TDDB), stress migration (SM), and thermal cycling (TC), based on the ambient temperature information, the heat generation pattern, and the power consumption pattern.

Further, the satellite system optimizing apparatus which considers a hard error stability and a soft error stability according to the exemplary embodiment of the present disclosure may further include an applying unit which acquires an operation requirement for the satellite system and updates the scheduling policy such that the quantified soft error stability and hard error stability match the operation requirement.

Further, the applying unit may determine the iterative performance level in accordance with an interval of an operation period of the satellite system which is divided into a plurality of intervals based on the ambient temperature information.

The above-described solving means are merely illustrative but should not be construed as limiting the present disclosure. In addition to the above-described embodiments, additional embodiments may be further provided in the drawings and the detailed description of the present disclosure.

According to the solving means of the present disclosure, it is possible to provide an apparatus and a method for optimizing a satellite system by considering a hard error stability and a soft error stability which analyze the soft error stability and the hard error stability by adjusting a task scheduling of a processor in a system which cannot be consistently maintained or corrected, but needs to operate for a long time without having errors, such as a satellite, to optimize the system.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a view illustrating a periodic change in an ambient temperature of a low earth orbit (LEO) satellite;

FIG. 2 is a schematic diagram of a satellite system including a satellite system optimizing apparatus according to an exemplary embodiment of the present disclosure which considers a hard error stability and a soft error stability;

FIG. 3 is a conceptual view for explaining an overall process of a satellite system optimizing technique according to an exemplary embodiment of the present disclosure which considers a hard error stability and a soft error stability;

FIG. 4 is a graph exemplarily illustrating a quantification result of a soft error stability and a hard error stability in accordance with the change of a scheduling policy;

FIG. 5 is a table exemplarily illustrating a functional safety standard related to an operation requirement for a satellite system;

FIG. 6 is a view illustrating an operation period of the satellite system which is divided into a plurality of intervals with respect to the temperature;

FIGS. 7A and 7B are graphs exemplarily illustrating a quantification result of a soft error stability and a hard error stability when a different scheduling policy is applied depending on the temperature of the satellite system by considering a thermal cycling stability of the satellite system;

FIG. 8 is a schematic diagram of a satellite system optimizing apparatus according to an exemplary embodiment of the present disclosure which considers a hard error stability and a soft error stability; and FIG. 9 is an operation flowchart of a satellite system optimizing method according to an exemplary embodiment of the present disclosure which considers a hard error stability and a soft error stability.

DETAILED DESCRIPTION OF THE EMBODIMENT

Hereinafter, the present disclosure will be described more fully hereinafter with reference to the accompanying drawings, in which exemplary embodiments of the present disclosure are shown so that those skilled in the art to which the present disclosure pertains can easily implement them. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The present disclosure relates to an apparatus and a method for optimizing a satellite system considering a hard error stability and a soft error stability. For example, the present disclosure relates to a technique for collectively analyzing and optimizing a soft error stability and a hard error stability of a processor which operates in a severe environment in which a temperature significantly changes and exposure to radiation exists, such as a satellite.

FIG. 2 is a schematic diagram of a satellite system including a satellite system optimizing apparatus according to an exemplary embodiment of the present disclosure which considers a hard error stability and a soft error stability.

Referring to FIG. 2, a satellite system 10 according to an exemplary embodiment of the present disclosure may include a satellite system optimizing apparatus 100 according to an exemplary embodiment of the present disclosure which considers a hard error stability and a soft error stability (hereinafter, referred to as an optimizing apparatus 100) and a processor 200.

The optimizing apparatus 100 and the processor 200 may communicate with each other by means of a network (not illustrated). The network (not illustrated) means a connection structure which allows information exchange between nodes such as terminals or servers. Examples of the network (not illustrated) include $3^{rd}$ generation partnership project (3GPP) network, a long term evolution network, a 5G network, a world interoperability for microwave access (WiMAX) network, Internet, a local area network (LAN), a wireless local area network (wireless LAN), a wide area network (WAN), a personal area network (PAN), a Wi-Fi network, a Bluetooth network, a satellite broadcasting network, an analog broadcasting network, and a digital multimedia broadcasting (DMB) network, but are not limited thereto.

Further, referring to FIG. 2, the satellite system 10 may include an optimizing apparatus 100 which establishes a scheduling policy to perform a task by considering hardware information of the processor 200 loaded in a low earth orbit (LEO) satellite 1 and workload information (mission information) of a task to drive a satellite 1 which is performed by the processor 200 and integratively analyzes (quantifies) the soft error stability and the hard error stability in accordance with the scheduling policy.

In other words, the satellite system 10 disclosed in the present disclosure may be implemented for the low earth orbit (LEO) satellite 1, but is not limited thereto and the scheduling technique disclosed in the present disclosure may be widely applied to various systems such as satellites, automobiles, and transportation means having a low temperature operation section.

Hereinafter, a specific function and operation of the optimizing apparatus 100 will be described in detail with reference to FIG. 3.

FIG. 3 is a conceptual view for explaining an overall process of a satellite system optimizing technique according to an exemplary embodiment of the present disclosure which considers a hard error stability and a soft error stability.

Referring to FIG. 3, the optimizing apparatus 100 may acquire all information of the satellite system 10 (satellite system info) to model a task performed by the satellite system 10, such as a workload model or a power/temperature model, and a change of the satellite system 10 by the task.

Further, the optimizing apparatus 100 may reflect the modeling result to perform task-level soft-error handling which refers to a process of establishing a task scheduling policy to tolerate the soft error for the task performed in the satellite system 10.

With regard to this, the optimizing apparatus 100 may be associated with a real-time operating system (RTOS) which is an operating system which is developed for a real-time application program. Specifically, the optimizing apparatus 100 may be designed so as to focus on a time management part of the processor (CPU, etc.) among functions of the operating system and may exemplarily apply a preemptive rate-monotonic (RM) scheduling through a real-time operating system which is classified into a hard real-time operating system and a soft real-time operating system, but is not limited thereto.

Further, the optimizing apparatus 100 may deduce, respectively, a soft error stability quantification result associated with a functional safety standard of the satellite system 10 and a hard error stability quantification result associated with an expected lifetime of the satellite system 10 by means of a soft error reliability model and a hard error reliability model built to evaluate (quantify) the change in the soft error stability and the hard error stability of the satellite system 10 in response to the established scheduling policy.

Specifically, the optimizing apparatus 100 may acquire hardware information of the processor 200 loaded in the satellite system 10. According to an exemplary embodiment of the present disclosure, the hardware information of the processor 200 may include information about a heat generation pattern and information about a power consumption pattern, in accordance with the performance of the task of the processor 200.

To be more specific, the optimizing apparatus 100 may hold a power model which deduces a power consumption pattern of the power in accordance with the performance of the task and a heat generation (temperature change) model which deduces a heat generation pattern in accordance with the performance of the task of the processor 200 based on the power consumption pattern deduced by the power model and ambient temperature information of the satellite system 10.

According to the exemplary embodiment of the present disclosure, the power consumption modeling of the processor 200 may be performed based on an operating frequency and a utilization rate of the processor 200. According to the exemplary embodiment of the present disclosure, the optimizing apparatus 100 may perform the power modeling based on the following Equation 1.

$$P = U_I \cdot P_I(f) + U_F \cdot P_F(f) + P_{oth} \quad \text{[Equation 1]}$$

Here, f denotes an operating frequency of the processor 200 and UI and UF denote utilization rates of the processor 200 (to be more specific, a utilization rate of an integer unit of the processor 200 and a utilization rate of a floating point unit (FPU) of the processor 200). Further, referring to Equation 1, it is confirmed that the higher the operating frequency of the processor 200, the larger the power consumption of the processor 200 and the higher the utilization rate, the larger the power consumption of the processor 200.

Further, according to the exemplary embodiment of the present disclosure, the temperature (heat generation) modeling in accordance with an operation of the processor 200 may be performed by an RC circuit modeling technique. With regard to this, the optimizing apparatus 100 may perform the temperature (heat generation) modeling such that the heat generation (temperature change) of the processor 200 varies in accordance with the power consumption of the processor 200 which is deduced as the above-described power modeling result and the ambient temperature of the satellite system 10. According to the exemplary embodiment of the present disclosure, the optimizing apparatus 100 may perform the heat generation modeling based on the following Equations 2-1 and 2-2.

$$T_{ss} = \frac{B}{A} = \frac{P(t) + G \cdot T_{amb}}{G} \quad \text{[Equation 2-1]}$$

$$T(t) = T_{ss} + (T(t_0) - T_{ss}) \cdot e^{-A(t-t_0)} \quad \text{[Equation 2-2]}$$

Here, G denotes a conductivity of heat dissipated from a core of the processor 200 to the outside, $T_{amb}$ is an ambient (environmental) temperature of the satellite system 10, P(t) denotes a consumed power of the processor 200 in accordance with Equation 1, $T_{ss}$ denotes a normal state temperature of the processor 200, T(t) denotes a temperature modeling result of the processor 200, and T(to) denotes an initial temperature of the processor 200.

Further, the optimizing apparatus 100 may acquire workload information including a task performed in the processor 200.

Specifically, according to the exemplary embodiment of the present disclosure, the optimizing apparatus 100 may model each of the plurality of tasks performed in the processor 200, based on a worst-case execution time (WCET) and a period p. With regard to this, a basic task which is normally performed without considering the tolerance for a soft error performs only a predetermined computational operation. However, when a technique for tolerating an unexpected soft error is additionally applied, the corresponding task performs an additional task (to detect or correct the error, etc.). As described above, an associated function of the hardware or the software may be used to detect or correct the soft error. When a task considering the generation of the soft error is additionally performed, the worst-case execution time for the task may be increased due to an additional computational overhead.

Further, the optimizing apparatus 100 may establish a scheduling policy for each task performed in the processor 200 based on the acquired hardware information and workload information. Specifically, the optimizing apparatus 100 may establish the scheduling policy to determine an iterative performance level for each task to perform at least one of a detecting operation and a correcting operation of a possible error during the task.

Specifically, the optimizing apparatus 100 may determine the number of times of repeating a specific task required to detect an error (a soft error) or correct the detected error (a soft error) by applying a hardware technique or a software technique in accordance with a parameter (a period, a performing time, etc.) for each of the tasks deduced from the workload information and the hardware information (specification) of the satellite system 10, as the iterative performance level.

When the error is detected or corrected by utilizing a function inherent in the hardware, the overhead in accordance with the additional computation is not generated, but the software-based error detection or correction technique may be achieved by repeatedly performing the corresponding task. That is, in order to detect the error based on the software, the corresponding task is repeated two times and when results of the two executions do not match, it is detected that there is an error. In the case of the software-based error correction, the task is repeated three or more times to deduce a correct output value for the corresponding task by the decision of the majority. With regard to this, since the probability that all the plurality of results indicates an error is extremely low, the soft error which is generated with a low probability may be overcome through a decision of the majority which compares the repeated execution results. Based on the error detection/correction processor, the optimizing apparatus 100 of the present disclosure may establish a scheduling policy to determine a task and how many times the task will be repeated to detect/correct an error.

As a technique for determining the iterative performance level, the optimizing apparatus 100 may establish a (m, k)

pattern to determine a pattern of repeating m performances among continuous k performances for a specific task, as a scheduling policy. In other words, the optimizing apparatus 100 may change a value of m which is the number (level) of repeating the task to detect or correct the soft error during k performances.

To be more specific, an iterative performance level for a predetermined task may be increased or decreased as the frequency of the detecting operation or the correcting operation of the error (soft error) changes. A variation width of the iterative performance level in accordance with the change in the frequency of the correcting operation may be larger than a variation width of the iterative performance level in accordance with the change in the frequency of the detecting operation. In other words, according to the scheduling policy established in consideration of the soft error, the optimizing apparatus 100 needs to repeat the task at least two or more times to perform one time of correcting operation and needs to repeat the task at least one time to perform one time of detecting operation. Therefore, as the scheduling policy is determined to perform the correcting operation more, the iterative performance level may be increased larger than that of the detecting operation.

Further, the optimizing apparatus 100 may quantify the soft error stability and the hard error stability in accordance with the established scheduling policy.

To be more specific, the optimizing apparatus 100 may calculate an error occurrence probability associated with the soft error stability in consideration of the established scheduling policy. With regard to this, according to the exemplary embodiment of the present disclosure, the optimizing apparatus 100 may deduce the occurrence probability of an error (soft error) for the task which may occur even though a predetermined task is repeated based on the iterative performance level determined in accordance with the scheduling policy by applying the collected scheduling policy, as an indicator indicating the soft error stability of the satellite system 10.

In other words, the soft error stability of the satellite system 10 deduced by the optimizing apparatus 100 may be calculated based on the probability of occurring an error per unit time according to the established scheduling policy and such an error occurrence probability may be quantified to a probability of failure per hour (PFH), a failure in time (FIT), or the like in the functional safety standard.

To be more specific, according to the above-described (m, k) pattern-based scheduling policy, the optimizing apparatus 100 may calculate a probability that the $l_h$ errors are not corrected during m times of task performances to which the iterative performance for detection or correction is added, by the following Equation 3-1 and calculate a probability that $l_n$ errors occur by k-m times of task performances to which the iterative performance for detection or correction is not added, by the following Equation 3-2, respectively.

$$\text{fr\_h}_{(m,k)}(l_h) = \binom{m}{l_h} \cdot vh_n^{l_h} \cdot (1-vh_n)^{m-l_h} \quad \text{[Equation 3-1]}$$

$$\text{fr\_n}_{(m,k)}(l_h) = \binom{k-m}{l_n} \cdot v_n^{l_n} \cdot (1-v_n)^{k-m-l_n} \quad \text{[Equation 3-2]}$$

Further, the optimizing apparatus 100 may collectively deduce the probability that $l$ ($=l_h+l_n$) errors occur in the overall task performances (k times of task performances) based on Equations 3-1 and 3-2 by the following Equation 3-3.

$$fr_{(m,k)}(l) = \sum_{l_h=max(0,l-(k-m))}^{min(l,m)} \text{fr\_h}_{(m,k)}(l_h) \cdot \text{fr\_n}_{(m,k)}(l-l_h) \quad \text{[Equation 3-3]}$$

Here, $v_n$ may be an error occurrence probability (failure probability) of a normal single performance of the task and $vh_n$ may be a failure probability in accordance with the addition of the iterative performance of the task for detecting or correcting an error. Further, $v_n$ may be calculated based on the worst-case execution time which is a parameter for the task and $vh_n$ may be calculated based on $v_n$.

Further, the optimizing apparatus 100 may calculate the error occurrence probability based on the (m, k) pattern which withstands a maximum of s instances by assuming that the scheduling policy based on the (m, k) pattern is inherently tolerant of a specific number of faulty executions, based on the following Equation 3-4.

$$Fr_{(m,k)} = 1 - \sum_{l=0}^{s} fr_{(m,k)}(l) \quad \text{[Equation 3-4]}$$

In the meantime, the optimizing apparatus 100 may calculate at least one of the probability of failure per hour (PFH) and the failure in time (FIT) which is a standardized error occurrence level which is defined in accordance with the functional safety standard based on the deduced error occurrence probability $Fr_{(m,k)}$.

Specifically, FIT may be calculated by the following Equations 4-1 and 4-2 and PFH and FIT may satisfy the relationship of FIT=PFH×10⁹.

$$FIT_n = Fr_{(m,k)} \cdot \frac{3600}{p_n \cdot k} \cdot 10^9 \quad \text{[Equation 4-1]}$$

Here, $p_n \cdot k$ may refer to a scheduling length for the (m, k) pattern in the unit of seconds (s).

$$FIT = \sum_{i=1}^{N} FIT_i \quad \text{[Equation 4-2]}$$

Here, N may correspond to the number of entire workloads (tasks) performed in the satellite system 10.

Further, the optimizing apparatus 100 may quantify the hard error stability of the satellite system 10 by calculating the system lifetime associated with the hard error stability based on hardware information, the previously established scheduling policy, and ambient temperature information of the satellite system 10.

Specifically, according to the exemplary embodiment of the present disclosure, the optimizing apparatus 100 may calculate a system lifetime of the satellite system 10 by reflecting a heat generation pattern and a power consumption pattern of the processor 200 which change based on the iterative performance level determined when the scheduling policy is established. With regard to this, the optimizing apparatus 100 may predict the change in the system lifetime of the satellite system 10 in accordance with the iterative performance level by considering the above-described power modeling result and heat generation (temperature) modeling result.

Further, according to the exemplary embodiment of the present disclosure, the optimizing apparatus 100 may calculate the system lifetime which considers at least one failure mechanism among electromigration (EM), time-dependent dielectric breakdown (TDDB), stress migration (SM), and thermal cycling (TC) based on the ambient temperature information, the heat generation pattern of the processor 200, and the power consumption pattern of the processor 200 as an indicator indicating the hard error stability of the satellite system 10.

First, the electromigration (EM) mechanism refers to dislocation of metal atoms in an interconnect due to a momentum transmitted by an electronic current and the EM increases a resistance of the interconnect or an open circuit and the lifetime (MTTF) of the satellite system 10 by the EM may be modeled as represented in the following Equation 5-1.

$$MTTF_{EM} = \frac{A_{EM}}{J^x} \cdot e^{\frac{E_{a,EM}}{k \cdot T}}$$ [Equation 5-1]

Further, the time-dependent dielectric breakdown (TDDB) mechanism is caused by a phenomenon that a gate dielectric is worn in accordance with the elapse of time to cause the failure of the transistor and a lifetime (MTTF) of the satellite system 10 by the TDDB may be modeled as represented in the following Equation 5-2.

$$MTTF_{TDDB} = A_{TDDB} \cdot \left(\frac{1}{V}\right)^{(a-bT)} \cdot e^{\frac{X+Y/T+ZT}{k \cdot T}}$$ [Equation 5-2]

Here, $A_{TDDB}$ is a fitting constant, V is a voltage, and a, b, X, Y, and Z are empirical fitting parameters.

Further, the stress migration (SM) mechanism is caused by movement of the metal atoms in the interconnect due to the thermal mismatch between different materials.

$$MTTF_{SM} = A_{SM} \cdot |T_o - T|^{-y} \cdot e^{\frac{E_{a,SM}}{k \cdot T}}$$ [Equation 5-3]

Further, the thermal cycling (TC) mechanism is mainly caused by the difference in thermal expansion coefficients between adjacent materials so that the TC may act with a different tendency from the above-described failure mechanism. Specifically, the accumulated damage due to the TC may cause permanent failures to a package, a solder, an interconnect, and a dielectric material so that in the TC mechanism, the temperature gradient over the time for the satellite system 10 acts as an important factor and the MTTF due to the TC may be modeled as represented in the following Equation 5-4.

$$MTTF_{TC} = \frac{p_{TC}}{\sum \frac{1}{N_{C_i}}}$$ [Equation 5-4]

Specifically, it is known that the failure mechanisms other than TC are more severe at a high temperature so that when during a normal semiconductor-based system operation, the heat generation is reduced as much as possible by means of the low power operation, the lifespan is correspondingly increased. In contrast, in the case of the TC, the difference of the temperature change is important rather than an absolute value of the temperature so that it may be very fatal in the satellite system 10 which undergoes the significant temperature change.

With regard to this, the optimizing apparatus 100 disclosed in the present disclosure may operate to establish the scheduling policy which reduces a thermal cycling amplitude by considering the TC mechanism of the satellite system 10 and during the process of establishing (determining) the scheduling policy, the soft error stability and the hard error stability may be considered together. The establishment of the scheduling policy considering the TC mechanism will be described below with reference to FIGS. 6 to 7B.

FIG. 4 is a graph exemplarily illustrating a quantification result of a soft error stability and a hard error stability in accordance with the change of a scheduling policy.

(a) of FIG. 4 illustrates a change in the utilization rate of the processor 200 in accordance with the change of the iterative performance level (a value of m indicating the number of times of repeating the task among k times (16 times in FIG. 4) of executions of the task), (b) of FIG. 4 illustrates the change in the power consumption of the processor 200 in accordance with the change of the iterative performance level, (c) of FIG. 4 illustrates the change in the hard error stability (system lifetime) in accordance with the change of the iterative performance level, and (d) of FIG. 4 illustrates the change of the soft error stability (error occurrence probability) in accordance with the change of the iterative performance level.

Further, in FIG. 4, SW/SW indicates that the error detection and correction are performed based on the software, HW/SW indicates that the error detection is performed based on the hardware and the error correction is performed based on the software, and HW/HW indicates that the error detection and correction are performed based on the hardware.

Referring to FIG. 4, in the case of HW/HW, the error detection and correction by means of the hardware may be performed without being greatly affected by the iterative performance level (in FIG. 4, the value m of repetitions among times of performing the task) so that the soft error stability or the hard error stability may be insignificantly changed in spite of the change of the iterative performance level.

In contrast, referring to FIG. 4, when the error is detected and corrected by the software (SW/SW), it can be confirmed that as the iterative performance level is increased (in other words, the value m is increased), the utilization rate of the processor 200 is increased, the power consumption of the processor 200 is increased, the hard error stability (system lifetime) deteriorates, and the soft error stability (error occurrence probability) is improved.

In contrast, referring to FIG. 4, when the error is detected and corrected by the software (SW/SW), it can be confirmed that as the iterative performance level is decreased (in other words, the value m is reduced), the utilization rate of the processor 200 is decreased, the power consumption of the processor 200 is decreased, the hard error stability (system lifetime) is improved, and the soft error stability (error occurrence probability) deteriorates.

That is, when the quantification result for the soft error stability and the hard error stability deduced by the optimizing apparatus 100 is summarized, it is confirmed that there is an apparent trade-off relationship between the soft error stability and the hard error stability. With regard to this, the optimizing apparatus 100 may determine (employ) a scheduling policy including an iterative performance level of the corresponding task by considering a relative relationship of the quantified soft error stability and hard error stability, a type of the task, an operation requirement of the satellite system 10, and the like.

Specifically, according to the exemplary embodiment of the present disclosure, the optimizing apparatus 100 may acquire the operation requirement for the satellite system 10 and update the scheduling policy such that the quantified soft error stability and hard error stability match the operation requirement. Here, the operation requirement may correspond to the stability level required for the functional safety standard associated with the satellite system 10.

FIG. 5 is a table exemplarily illustrating a functional safety standard related to an operation requirement for a satellite system.

Referring to FIGS. 4 and 5, for example, when the operation requirement for the satellite system 10 corresponds to a requirement "SIL 2" of the IEC-61508 standard, a FIT value needs to be 1000 or lower. At this time, the iterative performance level may be determined to be m=6 to maximize the lifetime of the satellite system 10 while satisfying the operation requirement.

As another example, when the operation requirement for the satellite system 10 is enhanced to correspond to the requirement "SIL 3" of the IEC-61508 standard, the FIT value needs to be 100 or lower. In this case, the optimizing apparatus 100 may determine whether the operation requirement is satisfied when m is 15 or higher to determine the iterative performance level to be m=15.

FIG. 6 is a view illustrating an operation period of the satellite system which is divided into a plurality of intervals with respect to the temperature.

Referring to FIG. 6, the operation period of the satellite system 10 may be divided from an interval 1 to an interval 10 with respect to a temperature of the satellite system 10. With regard to this, when the above-described TC mechanism is considered, an amplitude of the temperature of the satellite system 10, rather than the absolute temperature, may mainly affect the hard error stability of the satellite system 10. Therefore, different scheduling policies may be individually established for a point (interval) where the temperature is relatively high and a point (interval) where the temperature is relatively low.

Further, according to the exemplary embodiment of the present disclosure, the optimizing apparatus 100 may determine the iterative performance level in accordance with the intervals of the operation period of the satellite system 10 which is divided into a plurality of intervals based on the ambient temperature information of the satellite system 10. Hereinafter, an exemplary embodiment that the optimizing apparatus 100 disclosed in the present disclosure determines a different iterative performance level for a task in each of the plurality of intervals in the operation period of the satellite system 10 which is divided with respect to the temperature to enhance the soft error stability while dramatically reducing the thermal cycling (TC) effect of the satellite system 10 will be described with reference to FIGS. 7A and 7B.

FIGS. 7A and 7B are graphs exemplarily illustrating a quantification result of a soft error stability and a hard error stability when a different scheduling policy is applied depending on the temperature of the satellite system by considering a thermal cycling stability of the satellite system.

Specifically, FIG. 7A is a graph illustrating changes of the utilization rate, the power consumption, the expected lifetime, and the error occurrence probability while changing the iterative performance level for the highest temperature interval (interval 10).

Referring to FIGS. 4 and 7A together, when the iterative performance level is adjusted for the highest temperature interval (interval 10) as illustrated in FIG. 7A, it is confirmed that greater lifetime improvement may be achieved. This means that in the highest temperature interval (the interval 10), the less the heat generation in the satellite system 10, the greater the improvement of the lifetime and in contrast, when the temperature is larger in the highest temperature interval (the interval 10), it directly affects the thermal cycling amplitude to greatly deteriorate the lifetime. Specifically, referring to FIG. 7A, it is confirmed that when the iterative performance level is adjusted for the highest temperature interval, if the operation requirement corresponds to "SIL 3', the functional safety standard is satisfied even with the iterative performance level which is 8 or higher (m=8 or higher).

Further, FIG. 7B is a graph illustrating the changes of the utilization rate, the power consumption, the expected lifetime, and the error occurrence probability while maintaining the iterative performance level to the minimum (m=0) in the highest temperature interval (interval 10), maintaining the iterative performance level to the maximum (m=16) in a lowest temperature interval (interval 1), and changing the iterative performance level in the remaining intervals (intervals 2 to 9).

Referring to FIG. 7B, when the iterative performance level is determined such that the heat generation is minimized in the highest temperature interval of the satellite system 10 and the heat generation is maximized in the lowest temperature interval by considering the thermal cycling of the satellite system 10, it is confirmed that in the intermediate intervals (intervals 2 to 9), the change in the stability in accordance with the change of the iterative performance level is not so large, the system lifetime is consistently maintained to be high. Specifically, referring to FIG. 7B, when a lowest iterative performance level is applied for the highest temperature interval and a highest iterative performance level is applied for the lowest temperature interval, it is confirmed that if the operation requirement corresponds to "SIL 2", the functional safety standard is satisfied even with the iterative performance level which is 6 or higher (m=6 or higher).

In other words, the optimizing apparatus 100 according to the exemplary embodiment of the present disclosure may individually set the iterative performance level for every time interval in accordance with the temperature by considering the thermal cycling of the satellite system 10.

To be more specific, the optimizing apparatus 100 may determine the scheduling policy such that as it is applied for the interval corresponding to a relatively low temperature of the satellite system 10, the iterative performance level is increased (in other words, re-executed with a high strength). In contrast, the optimizing apparatus 100 may determine the scheduling policy such that as it is applied for the interval corresponding to a relatively high temperature of the satellite system 10, the iterative performance level is lowered (in other words, re-executed with a low strength). With regard to this, according to the exemplary embodiment of the present disclosure, the optimizing apparatus 100 establishes the scheduling policy to maximize the iterative performance level for the time interval corresponding to the lowest temperature of the satellite system 10 and minimize the iterative performance level for a time interval corresponding to the highest temperature to dramatically reduce the influence by the thermal cycling (TC).

FIG. 8 is a schematic diagram of a satellite system optimizing apparatus according to an exemplary embodiment of the present disclosure which considers a hard error stability and a soft error stability.

Referring to FIG. 8, the optimizing apparatus 100 may include a collecting unit 110, a scheduling unit 120, an evaluating unit 130, and an applying unit 140. Further, referring to FIG. 8, the evaluating unit 130 may include a first evaluating unit 131 and a second evaluating unit 132.

The collecting unit 110 may acquire hardware information of a processor 200 which is loaded in the satellite system 10 and workload information including a task performed by the processor 200.

The scheduling unit 120 may establish the scheduling policy for the task based on the acquired hardware information and workload information. Specifically, the scheduling unit 120 may determine an iterative performance level for each task to perform at least one of a detecting operation and a correcting operation of a possible error during the task.

The evaluating unit 130 may quantify the soft error stability and the hard error stability of the satellite system 10 in accordance with the established scheduling policy.

Specifically, the first evaluating unit 131 may calculate an error occurrence probability associated with the soft error stability in consideration of the scheduling policy.

Further, the second evaluating unit 132 may calculate a system lifetime associated with the hard error stability based on the hardware information, the scheduling policy, and ambient temperature information of the satellite system 10. Specifically, the second evaluating unit 132 may calculate the system lifetime by considering at least one failure mechanism among electromigration (EM), time-dependent dielectric breakdown (TDDB), stress migration (SM), and thermal cycling (TC), based on the ambient temperature information, the heat generation pattern and the power consumption pattern of the processor 200.

The applying unit 140 may acquire the operation requirement for the satellite system and update the scheduling policy such that the quantified soft error stability and hard error stability match the operation requirement.

Hereinafter, an operation flow of the present disclosure will be described in brief based on the above-detailed description.

FIG. 9 is an operation flowchart of a satellite system optimizing method according to an exemplary embodiment of the present disclosure which considers a hard error stability and a soft error stability.

The satellite system optimizing method considering the hard error stability and the soft error stability illustrated in FIG. 9 may be performed by the above-described optimizing apparatus 100. Therefore, even though some contents are omitted below, the contents which have been described for the optimizing apparatus 100 may be applied to the satellite system optimizing method considering the hard error stability and the soft error stability in the same way.

Referring to FIG. 9, in step S11, the collecting unit 110 may acquire hardware information of the processor 200 loaded in the satellite system 10.

Next, in step S12, the collecting unit 110 may acquire workload information including a task which is performed by the processor 200.

Next, in step S13, the scheduling unit 120 may establish the scheduling policy for the task based on the hardware information and the workload information. Specifically, in step S13, the scheduling unit 120 may determine an iterative performance level for each task to perform at least one of a detecting operation and a correcting operation of a possible error during the task.

Next, in step S14, the evaluating unit 130 may quantify the soft error stability and the hard error stability in accordance with the established scheduling policy.

Specifically, in step S14, the first evaluating unit 131 may calculate an error occurrence probability associated with the soft error stability by considering the scheduling policy.

Further, in step S14, the second evaluating unit 132 may calculate a system lifetime associated with the hard error stability based on the hardware information, the scheduling policy, and ambient temperature information of the satellite system 10.

Next, in step S15, the applying unit 140 may acquire an operation requirement for the satellite system 10.

Next, in step S16, the applying unit 140 may update (determine) the scheduling policy such that the quantified soft error stability and hard error stability match the acquired operation requirement.

In the above-description, steps S11 to S16 may be further divided into additional steps or combined as smaller steps depending on an implementation example of the present disclosure. Further, some steps may be omitted if necessary and the order of steps may be changed.

The satellite system optimizing method considering a hard error stability and a soft error stability according to the embodiment of the present disclosure may be implemented as program instructions which may be executed by various computer means to be recorded in a computer-readable medium. The computer-readable medium may include solely a program instruction, a data file, a data structure, and the like solely or in combination. The program instruction recorded in the medium may be specifically designed or constructed for the present disclosure or known to those skilled in the art of a computer software to be used. Examples of the computer-readable recording medium include magnetic media such as a hard disk, a floppy disk, or a magnetic tape, optical media such as a CD-ROM or a DVD, a magneto-optical media such as a floptical disk, and a hardware device which is specifically configured to store and execute the program instruction, such as a ROM, a RAM, and a flash memory. Examples of the program instruction include not only a machine language code which is created by a compiler but also a high level language code which may be executed by a computer using an interpreter. The hardware device may operate as one or more software modules in order to perform the operation of the present disclosure and vice versa.

Further, the above-described satellite system optimizing method considering a hard error stability and a soft error stability may also be implemented as a computer program or an application executed by a computer which is stored in a recording medium.

The above-description of the present disclosure is illustrative only and it is understood by those skilled in the art that the present disclosure may be easily modified to another specific type without changing the technical spirit or an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. An optimizing method for optimizing a satellite system considering a hard error stability and a soft error stability, the optimizing method comprising:
acquiring, by an optimizing apparatus, hardware information of a processor which is loaded in the satellite system;
acquiring, by an optimizing apparatus, workload information including a task which is performed by the processor;
establishing, by an optimizing apparatus, a scheduling policy for the task based on the hardware information and the workload information; and
quantifying, by an optimizing apparatus, the soft error stability and the hard error stability in accordance with the scheduling policy,
wherein the quantifying includes:
calculating an error occurrence probability associated with the soft error stability by considering the scheduling policy; and
calculating a system lifetime associated with the hard error stability based on the hardware information, the scheduling policy, and ambient temperature information of the satellite system,
wherein the hardware information includes information about a heat generation pattern and a power consumption pattern of the processor loaded in the satellite system,
wherein the optimizing apparatus comprises a power model and a heat generation model, and
wherein the acquiring of the hardware information comprises:
obtaining the power consumption pattern in accordance with performance of the task performed by the processor loaded in the satellite system by using the power model, and
obtaining the heat generation pattern in accordance with the performance of the task of the processor loaded in the satellite system by using the heat generation model based on the obtained power consumption pattern and the ambient temperature information of the satellite system.

2. The optimizing method according to claim 1, wherein in the establishing of a scheduling policy, an iterative performance level for each task to perform at least one of a detecting operation and a correcting operation of a possible error during the task is determined.

3. The optimizing method according to claim 1, wherein in the calculating of a system lifetime, the system lifetime is calculated by reflecting the heat generation pattern and the power consumption pattern which change based on the iterative performance level.

4. The optimizing method according to claim 3, wherein in the calculating of a system lifetime, the system lifetime is calculated by considering at least one failure mechanism among electromigration (EM), time-dependent dielectric breakdown (TDDB), stress migration (SM), and thermal cycling (TC), based on the ambient temperature information, the heat generation pattern, and the power consumption pattern.

5. The optimizing method according to claim 2, wherein the iterative performance level for a predetermined task varies as frequency of the detecting operation or the correcting operation changes and
a variation width of the iterative performance level in accordance with the change of the frequency of the correcting operation is larger than a variation width in accordance with the change of the frequency of the detecting operation.

6. The optimizing method according to claim 2, further comprising:
acquiring an operation requirement for the satellite system; and
updating the scheduling policy such that the quantified soft error stability and hard error stability match the operation requirement.

7. The optimizing method according to claim 6, wherein in the updating of the scheduling policy, the iterative performance level is determined in accordance with an interval of an operation period of the satellite system which is divided into a plurality of intervals based on the ambient temperature information.

8. An optimizing apparatus for optimizing a satellite system considering a hard error stability and a soft error stability, the optimizing apparatus comprising:
a processor; and
a memory storing instructions executable by the processor,
wherein the processor is configured to:
acquire hardware information of a processor which is loaded in the satellite system and workload information including a task which is performed by the processor loaded in the satellite system;
establish a scheduling policy for the task based on the hardware information and the workload information; and
quantify the soft error stability and the hard error stability in accordance with the scheduling policy,
wherein the processor of the optimizing apparatus is further configured to:
calculate an error occurrence probability associated with the soft error stability by considering the scheduling policy; and
calculate a system lifetime associated with the hard error stability based on the hardware information, the scheduling policy, and ambient temperature information of the satellite system,
wherein the hardware information includes information about a heat generation pattern and a power consumption pattern of the processor loaded in the satellite system,
wherein the optimizing apparatus comprises a power model and a heat generation model, and
wherein the processor of the optimizing apparatus is further configured to:
obtain the power consumption pattern is accordance with the performance of the task performed by the processor loaded in the satellite system by using the power model, and
obtain the heat generation pattern in accordance with the performance of the task of the processor loaded in the satellite system by using the heat generation model based on the obtained power consumption pattern and the ambient temperature information of the satellite system.

9. The optimizing apparatus according to claim 8, wherein the processor of the optimizing apparatus is further configured to determine an iterative performance level for each task to perform at least one of a detecting operation and a correcting operation of a possible error during the task.

10. The optimizing apparatus according to claim 2, wherein the processor of the optimizing apparatus is further configured to calculate the system lifetime by reflecting the heat generation pattern and the power consumption pattern which change based on the iterative performance level.

11. The optimizing apparatus according to claim 10, wherein the processor of the optimizing apparatus is further configured to calculate the system lifetime by considering at least one failure mechanism among electromigration (EM), time-dependent dielectric breakdown (TDDB), stress migration (SM), and thermal cycling (TC), based on the ambient temperature information, the heat generation pattern, and the power consumption pattern.

12. The optimizing apparatus according to claim 10, wherein the processor of the optimizing apparatus is further configured to acquire an operation requirement for the satellite system and update the scheduling policy such that the quantified soft error stability and hard error stability match the operation requirement.

13. The optimizing apparatus according to claim 12, wherein the processor of the optimizing apparatus is further configured to determine the iterative performance level in accordance with an interval of an operation period of the satellite system which is divided into a plurality of intervals based on the ambient temperature information.

* * * * *